(12) United States Patent
Liu et al.

(10) Patent No.: US 10,385,755 B2
(45) Date of Patent: Aug. 20, 2019

(54) METHOD FOR MANUFACTURING A CATALYTIC CONVERTER HOUSING ARRANGEMENT WITH AT LEAST ONE SENSOR CARRIER FOR AN EXHAUST SYSTEM OF A VEHICLE

(71) Applicants: Eberspächer Exhaust Technology GmbH & Co. KG, Neunkirchen (DE); Eberspächer Tecnologia de Exaustão Ltda., Sorocaba-SP (BR)

(72) Inventors: Dan Liu, Esslingen (DE); Kimura Leandro, Sorocaba-SP (BR); Rangel Thiesen, Sorocaba-SP (BR)

(73) Assignees: Eberspächer Exhaust Technology GmbH & Co. KG, Neunkirchen (DE); Eberspächer Tecnologia de Exaustão Ltda, Sorocaba-SP (BR)

( * ) Notice: Subject to any disclaimer, the term of this patent is extended or adjusted under 35 U.S.C. 154(b) by 311 days.

(21) Appl. No.: 15/367,668

(22) Filed: Dec. 2, 2016

(65) Prior Publication Data

US 2017/0159537 A1    Jun. 8, 2017

(30) Foreign Application Priority Data

Dec. 4, 2015 (DE) ........................ 10 2015 121 110

(51) Int. Cl.
*B21J 5/06* (2006.01)
*F01N 3/28* (2006.01)
(Continued)

(52) U.S. Cl.
CPC ........... *F01N 13/008* (2013.01); *B01D 53/94* (2013.01); *B21J 5/066* (2013.01); *B23K 31/02* (2013.01);
(Continued)

(58) Field of Classification Search
CPC ...... F01N 3/28; F01N 13/008; F01N 13/1872; F01N 2450/22; F01N 2560/025;
(Continued)

(56) References Cited

U.S. PATENT DOCUMENTS 7,279,140 B2   10/2007   Myers et al.
8,110,152 B2   2/2012    Schultz et al.
(Continued)

FOREIGN PATENT DOCUMENTS

CN   101380650 A   3/2009
CN   202866944 U   4/2013
(Continued)

OTHER PUBLICATIONS

"Welding Butt Joints," DeFlorin, <https://www.cartechbooks.com/techtips/weldingbuttjoints/> Apr. 23, 2012 (Year: 2012).*
(Continued)

*Primary Examiner* — Jacob J Cigna
(74) *Attorney, Agent, or Firm* — McGlew and Tuttle, P.C.

(57) ABSTRACT

A method is provided for manufacturing a catalytic converter housing arrangement with at least one sensor carrier for an exhaust system of a vehicle. The method includes the steps of:
a) providing at least one sensor carrier sheet metal blank (42);
b) forming at least one sensor mounting opening (48) in the sensor carrier sheet metal blank (42) by flow drilling such that a length (L) of the opening is greater than a thickness (D) of the material of the sensor carrier sheet metal blank (42) before step b) is carried out; and
c) preparing an internal thread in the at least one sensor mounting opening (48) for providing a sensor carrier.

16 Claims, 5 Drawing Sheets

(51) Int. Cl.
*B23K 31/02* (2006.01)
*F01N 13/00* (2010.01)
*F01N 13/18* (2010.01)
*B01D 53/94* (2006.01)

(52) U.S. Cl.
CPC ........... *F01N 3/28* (2013.01); *F01N 13/1872* (2013.01); *F01N 2450/22* (2013.01); *F01N 2560/025* (2013.01); *F01N 2560/026* (2013.01); *F01N 2560/06* (2013.01)

(58) Field of Classification Search
CPC ........... F01N 2560/026; F01N 2560/06; B23K 31/02; B21J 5/066; B01D 53/94
See application file for complete search history.

(56) References Cited

U.S. PATENT DOCUMENTS

| | | |
|---|---|---|
| 8,110,154 B2 | 2/2012 | Roth et al. |
| 8,795,598 B2 * | 8/2014 | Lawrukovich ........ F01N 3/2853 422/179 |
| 2001/0025419 A1 | 10/2001 | Celerier et al. |
| 2003/0010017 A1 * | 1/2003 | Myers ...................... B21J 5/066 60/276 |
| 2006/0024215 A1 | 2/2006 | Kroner et al. |
| 2007/0160510 A1 * | 7/2007 | Schultz ................... F01N 11/00 422/177 |
| 2007/0178026 A1 * | 8/2007 | Roth ................... B01D 53/9454 422/177 |
| 2017/0159537 A1 * | 6/2017 | Liu ........................... F01N 3/28 |

FOREIGN PATENT DOCUMENTS

| | | | |
|---|---|---|---|
| DE | 198 11 569 A1 | 9/1999 | |
| DE | 19811569 A1 * | 9/1999 | ........... B21C 37/298 |
| DE | 10 2011 018 748 B3 | 7/2012 | |
| DE | 10 2011 018748 B3 | 7/2012 | |
| DE | 102011018748 B3 * | 7/2012 | ........... B21C 37/065 |
| FR | 2 762 045 A1 | 10/1998 | |
| FR | 2762045 A1 * | 10/1998 | ........... B21C 37/298 |
| JP | H08-296436 A | 11/1996 | |

OTHER PUBLICATIONS

DE-102011018748-B3 Machine Translation (Year: 2012).*

* cited by examiner

Fig. 1  State of the Art

METHOD FOR MANUFACTURING A CATALYTIC CONVERTER HOUSING ARRANGEMENT WITH AT LEAST ONE SENSOR CARRIER FOR AN EXHAUST SYSTEM OF A VEHICLE

CROSS REFERENCE TO RELATED APPLICATIONS

This application claims the benefit of priority under 35 U.S.C. § 119 of German Application 10 2015 121 110.6 filed Dec. 4, 2015, the entire contents of which are incorporated herein by reference.

FIELD OF THE INVENTION

The present invention pertains to a method for manufacturing a catalytic converter housing arrangement with at least one sensor carrier for an exhaust system of a vehicle.

BACKGROUND OF THE INVENTION

Figure 1:
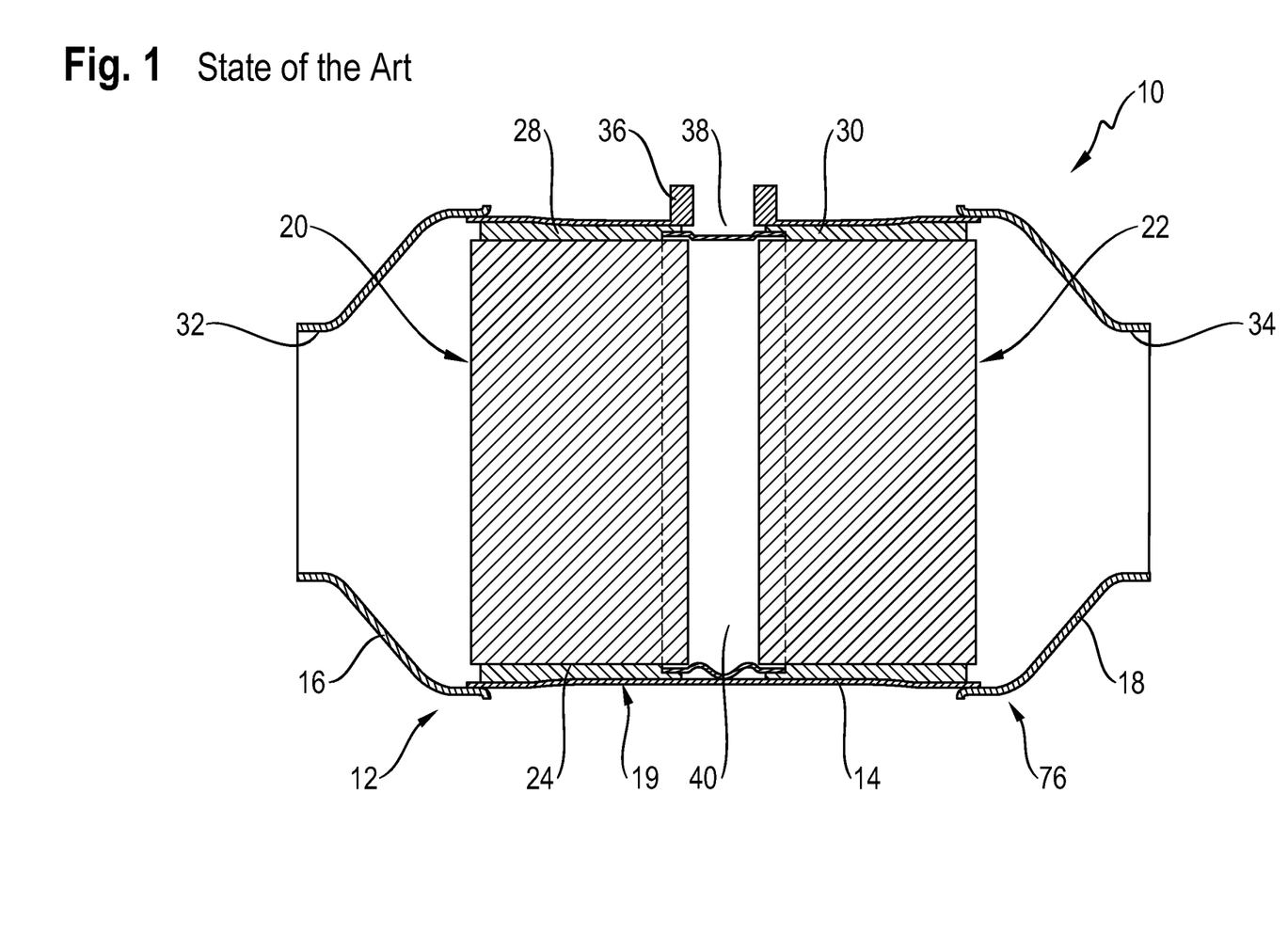
FIG. 1 is a longitudinal sectional view of a catalytic converter arrangement known from the state of the art.

US 2007/00178026A1 discloses a catalytic converter arrangement, on which a sensor carrier for a sensor, for example, for a gas sensor, may be provided. This catalytic converter arrangement is shown in FIG. 1 and is generally designated by 10. It comprises a catalytic converter housing arrangement 12 with a tubular, i.e., essentially cylindrical housing central area 14, which is, for example, configured with a circular cross section, and with a conical housing end area 16, 18 each located at the two end areas thereof. A catalytic converter housing 19 of the catalytic converter housing arrangement 12 is manufactured of a sheet metal material with the housing central area 14 and with the housing end areas 16, 18. Two catalytic converter units 20, 22 are provided in the interior space of the catalytic converter housing 19. Each catalytic converter unit 20, 22 comprises a catalytic converter block 24, 26, which has, for example, a monolithic configuration, and a mounting mat 28, 30, which surrounds this block 24, 26 and is mounted in the housing central area 14 by press fit. The exhaust gases discharged by an internal combustion engine can enter the catalytic converter arrangement 10 via an opening 32 of the housing end area 16. The exhaust gases can leave the catalytic converter arrangement 10 via an opening 34 of the housing end area 18.

An attachment 36, which is, for example, ring-shaped and at which a sensor carrier configured as an internal thread can be fixed by welding, is provided at the housing central area 14. A sensor, for example, a gas sensor, can be screwed into the sensor carrier and thus it can protrude into an intermediate space 40 formed between the two catalytic converter units 20, 22 through a sensor opening 38 provided on the catalytic converter housing 19 and thus detect there the gas composition, for example, the percentage of oxygen or the percentage of nitrogen.

SUMMARY OF THE INVENTION

An object of the present invention is to provide a method with which a catalytic converter housing arrangement, which makes it possible to reliably mount at least one sensor in a simple manner, can be manufactured for an exhaust system of a vehicle.

This object is accomplished according to the present invention by a method for manufacturing a catalytic converter housing arrangement with at least one sensor carrier for an exhaust system of a vehicle, comprising the steps of:
a) providing at least one sensor carrier sheet metal blank;
b) forming at least one sensor mounting opening in the sensor carrier sheet metal blank by flow drilling such that an opening length is greater than the material thickness of the sensor carrier sheet metal blank before step b) is carried out (the sensor carrier sheet metal blank has an initial material thickness and the opening length of the formed sensor mounting opening is greater than the carrier sheet metal blank initial material thickness); and
c) preparing an internal thread in the at least one sensor mounting opening for providing a sensor carrier.

An accumulation of material in the area surrounding the opening is also brought about at the same time during the preparation of this opening with the method according to the present invention due to the formation of at least one sensor mounting opening by flow drilling. Thus, the opening has an opening length that is greater than the initial thickness of the sensor carrier sheet metal blank, so that material is made available for preparing a sufficiently long internal thread.

The method according to the present invention may comprise, furthermore, the following steps:
d) providing a catalytic converter housing, preferably one made of sheet metal material, with at least one sensor opening; and
e) fixation of at least one sensor carrier sheet metal blank or sensor carrier on the catalytic converter housing before step b) is carried out or after step c) or after step b) and prior to step c).

Consequently, the sensor carrier sheet metal blank can already be fixed with this procedure before the preparation of an opening in it or before the preparation of the internal thread on the catalytic converter housing arrangement. As an alternative, the finished sensor carrier, i.e., the sensor carrier already provided with opening and thread, can be fixed on the catalytic converter housing arrangement. Depending on the manner of further processing, the catalytic converter housing may already have been provided as a housing composed of a plurality of parts or areas, or it may be provided for the further processing, especially also for arranging one or more sensor carriers or sensor carrier sheet metal blanks, such that individual parts are not yet assembled into a housing.

To make it possible to guarantee a stable and gas-tight arrangement of a sensor carrier on the catalytic converter housing, it is proposed that step e) comprise the fixation by welding.

Provisions may now be made, for example, for step e) to comprise the placing of at least one sensor carrier sheet metal blank or sensor carrier on an outer surface of the catalytic converter housing and the fixation by fillet welding. As an alternative, provisions may be made for a flush transition of the sensor carrier to the outer surface of the catalytic converter housing for step e) to comprise the insertion of at least one sensor carrier sheet metal blank or sensor carrier in a sensor carrier depression formed on the catalytic converter housing in the area of a sensor opening and fixation by I-profile seam welding.

Step d) may comprise the provision of the catalytic converter housing with an essentially cylindrical housing central area and, at at least one end of the housing central area, with an essentially conical housing end area, or/and the provision of the catalytic converter housing with at least one sensor opening in the housing central area. In particular, manufacture from a sheet metal material can be carried out simply and cost-effectively and it makes it possible to connect one or more sensor carriers by welding in a stable manner.

Step d) may comprise, further, the provision of the catalytic converter housing with at least one sensor opening in at least one housing end area or/and the provision of the catalytic converter housing with at least one sensor opening in at least one transition area from the housing central area to a housing end area.

The present invention pertains, furthermore, to a catalytic converter arrangement for an exhaust system of a vehicle, comprising a catalytic converter housing arrangement manufactured according to a method according to the present invention.

At least one sensor is preferably carried by thread meshing (engagement) at at least one sensor carrier fixed on the catalytic converter housing arrangement. The thread meshing makes it possible, on the one hand, to connect a sensor in a stable manner and, on the other hand, in a gas-tight manner to the catalytic converter housing arrangement via the sensor carrier.

At least one sensor being carried on the catalytic converter housing arrangement may be a gas sensor, preferably an $O_2$, sensor or $NO_x$ sensor, or/and at least one sensor being carried on the catalytic converter housing arrangement may be a temperature sensor. Consequently, a plurality of sensors, for example, different sensors, may, in principle, be carried on the catalytic converter housing arrangement in different positions in order to make it thus possible to provide comprehensive information on the state or the composition of the combustion waste gases.

At least one catalytic converter unit may be carried in the catalytic converter housing arrangement.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings, it should be noted, before a method for manufacturing a catalytic converter housing arrangement, especially a sensor carrier, will be described in detail below, that the configuration of a catalytic converter housing arrangement to be manufactured in this manner or of a catalytic converter arrangement comprising same may, in principle, be such as it is shown in FIG. 1 described above with reference to FIG. 1. Therefore, using the reference numbers already used in the introduction, reference will also be made in the context of the present invention to the general configuration of such a catalytic converter housing arrangement or catalytic converter arrangement as it is shown in FIG. 1.

Figure 2:
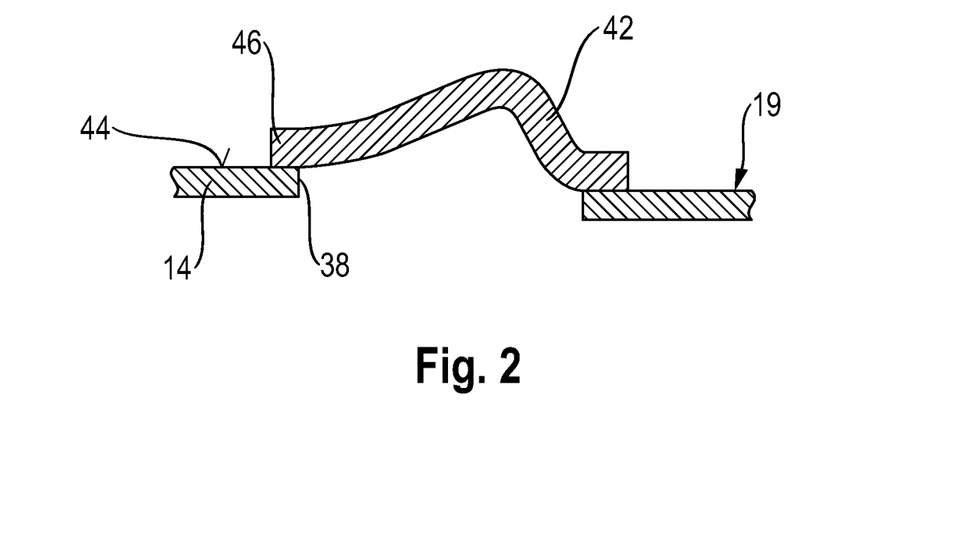
FIG. 2 is a sectional view of a sensor carrier sheet metal blank.

FIG. 2 shows a sensor carrier sheet metal blank 42 generally designated by 42 in contact with an outer surface 44 of the catalytic converter housing 19, here of the housing central area 14. The sensor carrier sheet metal blank 42 may be provided as an initially essentially flat component, for example, by punching or cutting out of a basic sheet metal material, for example, a metal sheet, and then transformed to the shape desired for the subsequent use, e.g., by pressing, bending or deep-drawing. The sensor carrier sheet metal blank 42 is thus provided with an edge area 46 shaped for being in contact with the catalytic converter housing 19 such that this edge area 46 can be in contact with the outer surface 44 in the entire area surrounding the sensor opening 38.

Figure 3:
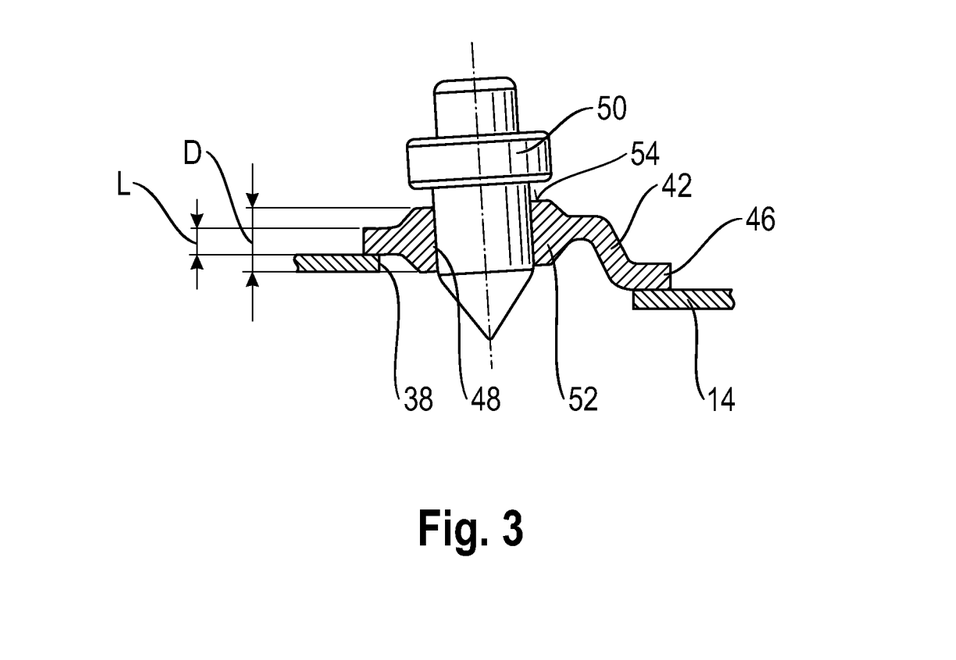
FIG. 3 is the sensor carrier sheet metal blank according to FIG. 2 when the flow drilling operation is being carried out.

In a then following working step, shown in FIG. 3, a sensor mounting opening 48 is prepared in the sensor carrier sheet metal blank 42 by flow drilling. Flow drilling, generally also known as "thermal friction drilling," is carried out with the use of a mandrel-like tool 50 heating to a high temperature and rotating about its longitudinal axis. The tool 50 is pressed against the sensor carrier sheet metal blank 42. The metallic material of the sensor carrier sheet metal blank 42 is locally melted in the process in the area acted on by the tool 50 displaced to the side. An area of thickened material 52 surrounding the sensor mounting opening 48 is formed in the process on both sides of the sensor carrier sheet metal blank 42, so that the sensor mounting opening 48 passing through this area of thickened material 52 has an opening length L that is greater than the initial thickness D of the sheet metal material of the sensor carrier sheet metal blank 42. The sensor carrier sheet metal blank 42 may also be prepared with an essentially flat contact surface 54 for a sensor by the tool 50 in the area of thickened material 52 during the flow drilling. As will be shown below, the contact surface 54 is located on the outer side in the prepared catalytic converter housing arrangement 12.

Figure 4:
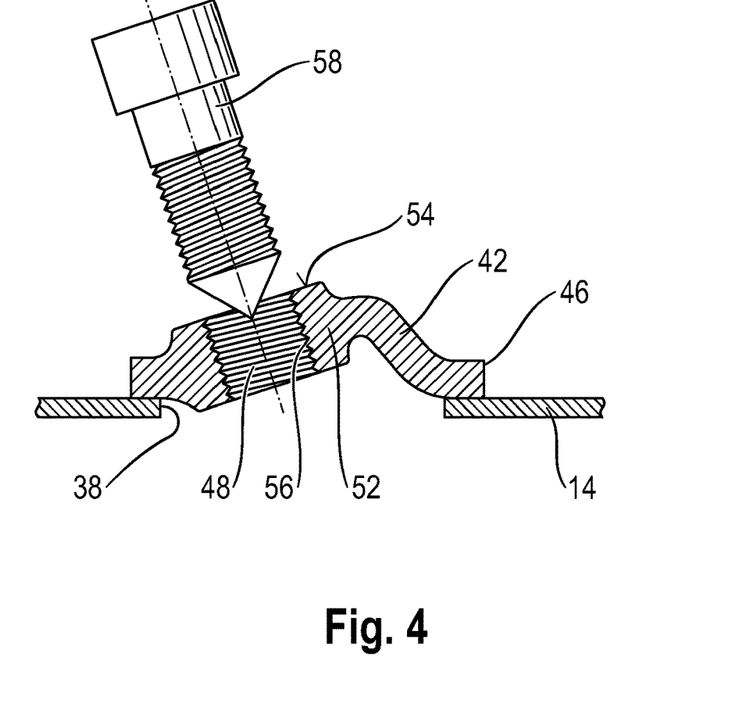
FIG. 4 is the flow drilled sensor carrier sheet metal blank during a thread-cutting operation.

In a next working step, shown in FIG. 4, an internal thread is cut in the sensor mounting opening 48 formed in the area of thickened material 52. The internal thread 56 may be prepared by a corresponding tool 58 immediately after preparation of the sensor mounting opening 38 in the still hot state of the sensor carrier sheet metal blank 42, or it may be prepared when the sensor carrier sheet metal blank 42 has already essentially cooled down.

The sensor carrier sheet metal blank 42 is essentially finished after preparation of the internal thread 56, so that a sensor carrier generally designated by 60 is provided. This is fixed by welding in a working step shown in FIG. 5 with its edge area 46 on the outer surface 44 of the catalytic converter housing 19, of the housing central area 14 in the example being shown. In case of fixation by welding in the manner shown in FIGS. 5 and 6, the edge area 46 is placed on the outer surface 44, which is essentially free from steps, but is curved because of the tubular configuration of the housing central area 14. A weld 62, which surrounds the entire edge area 46 and thus connects this area to the catalytic converter housing 19, can be prepared by fillet welding in the angular transition area between the edge area 46 and the outer surface 44. A stable and especially gas-tight connection is thus established between the sensor carrier 60 and the catalytic converter housing 19.

Figure 5:
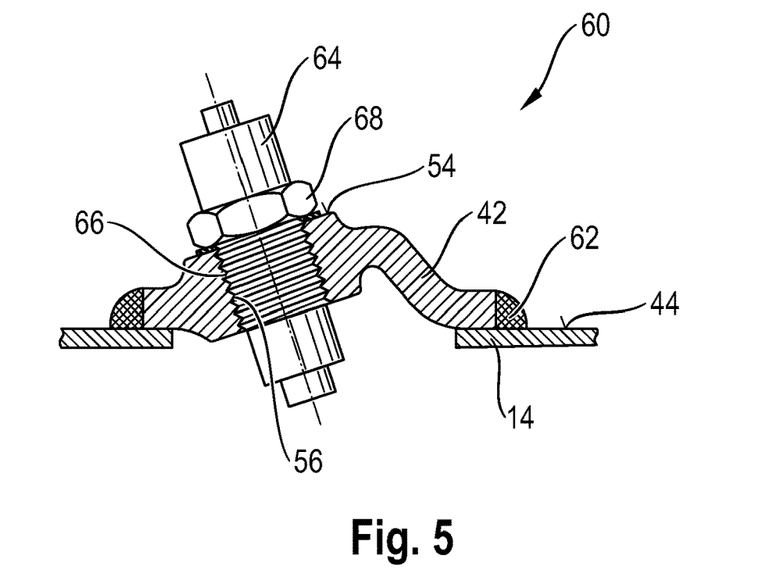
FIG. 5 is a sensor carrier on a catalytic converter housing with a sensor being carried thereon.
Figure 6:
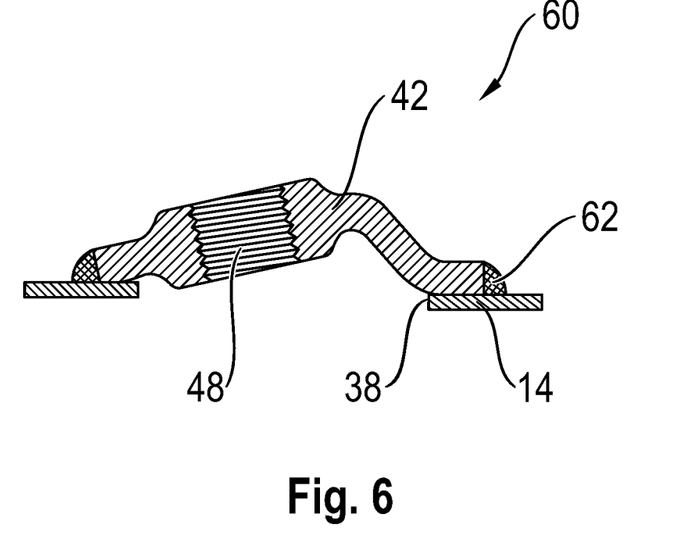
FIG. 6 is a sensor carrier fixed on a catalytic converter housing with a fillet weld.

A sensor generally designated by 64 can then be screwed into the sensor carrier 60, so that an external thread 66 provided thereon meshes with the internal thread 56. The sensor 64 can be screwed in to the extent that a stop 68 provided on it, for example, as a hexagon insert bit comes into gas-tight contact with the contact surface 54 of the sensor carrier 60, optionally via the intermediary of a ring-shaped sealing element.

When the sensor carrier 60 is manufactured or fixed, the different working steps described above may also be carried out in another chronological sequence. For example, after preparing the sensor carrier sheet metal blank 42 with the desired shape, this may be fixed to the catalytic converter housing 19 by welding. The sensor mounting opening 48 can then be prepared by flow drilling, and the internal thread 56 is then prepared in said opening. As an alternative, the sensor carrier sheet metal blank 42 could also be fixed on the catalytic converter housing 19 by welding when the sensor mounting opening 48 has been prepared in said sensor carrier sheet metal blank by flow drilling, but before the internal thread 56 is cut in the sensor mounting opening.

Figure 7:
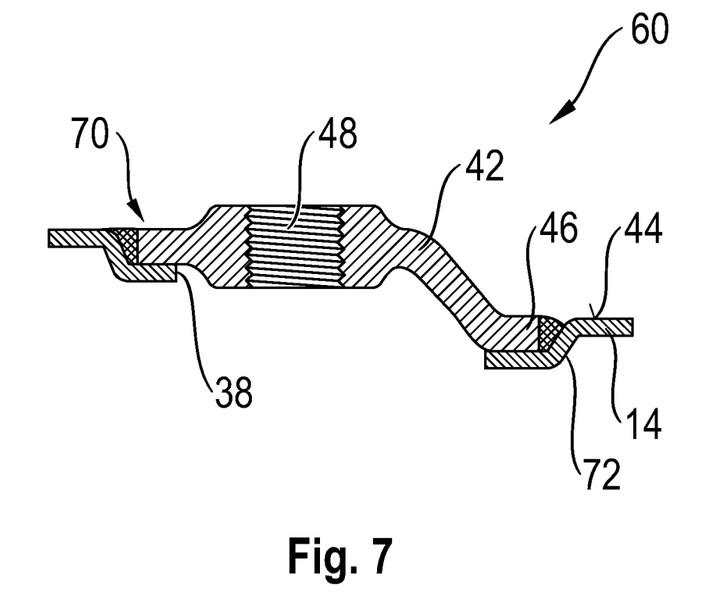
FIG. 7 is a sensor carrier fixed on a catalytic converter housing with an I-profile weld.

FIG. 7 shows an alternative manner of connecting the sensor carrier 60 and the sensor carrier sheet metal blank 42, depending on the sequence of the working steps, on the catalytic converter housing 19. A sensor carrier depression 70 corresponding in its circumferential contour to the circumferential contour of the sensor carrier 60 and of the sensor carrier sheet metal blank 42 is provided on the catalytic converter housing 19, for example, on the housing central area 14 in this variant. The sensor carrier 60 or the sensor carrier sheet metal blank 42 is inserted into this sensor carrier depression 70, so that an intermediate space is left between the edge area 46 and a wall 72 surrounding the sensor carrier depression 70. An I-profile weld 64, also called two-sided full seam, which surrounds the entire edge area 46 and fills the intermediate space essentially completely, is prepared in this intermediate area. The edge area 46 of the sensor carrier 60 or of the sensor carrier sheet metal blank 42 thus passes essentially flush over into the outer surface 44 of the catalytic converter housing 19 essentially without a step, via the weld 74.

Figure 8:
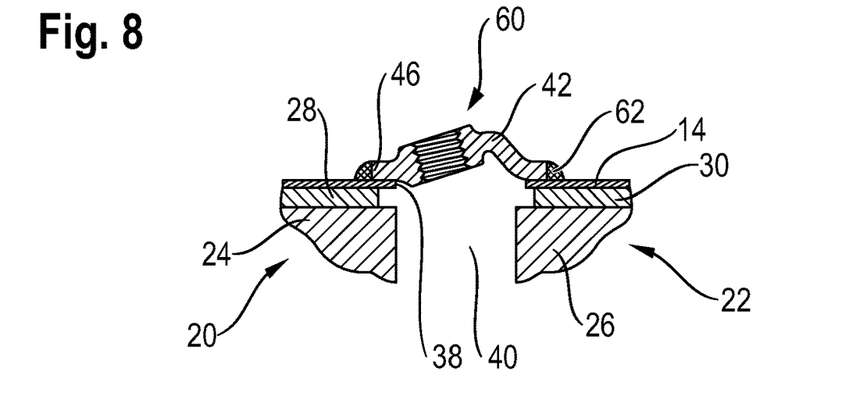
FIG. 8 is a sensor carrier fixed in the area of a housing central area.
Figure 9:
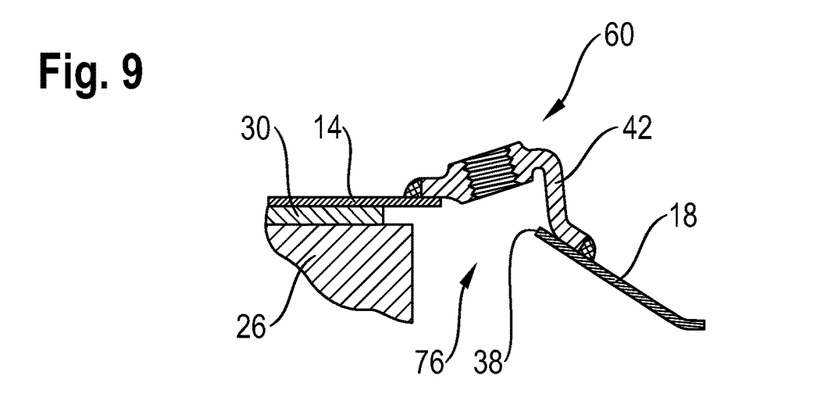
FIG. 9 is a sensor carrier fixed in a transition area from a housing central area to a housing end area.
Figure 10:
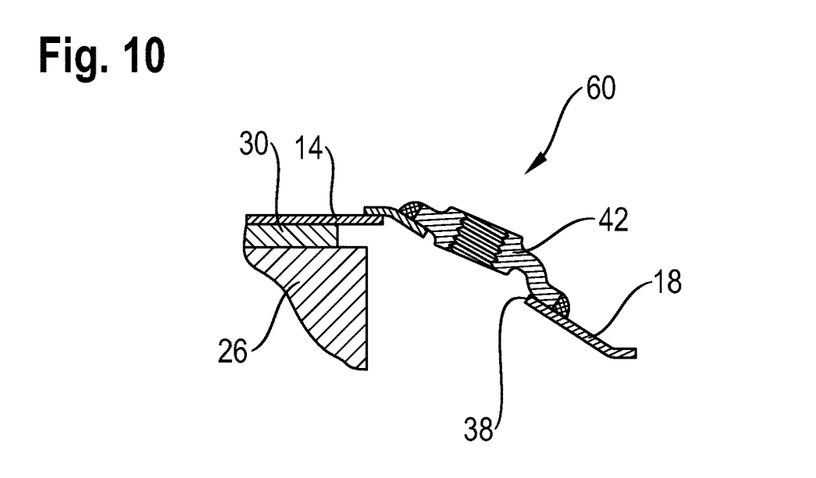
FIG. 10 is a sensor carrier fixed in a housing end area.

FIGS. 8-10 show different ways of positioning a sensor carrier 60 on the catalytic converter housing 19. The positioning shown in FIG. 8 also corresponds essentially to the position provided for a sensor carrier in case of the configuration shown in FIG. 1. The sensor opening 38 is provided in the housing central area 14, especially in the area of the intermediate space 40 formed between the two catalytic converter units 20, 22. A sensor to be fixed on the sensor carrier 60 can protrude into this intermediate space 40 and detect the composition of the gas or the temperature of the gas in this area.

The sensor carrier 60 is provided in a transition area 76 between the housing central area 14 and, for example, the housing end area 18 in the embodiment according to FIG. 9. The sensor opening 38 is formed in this variant, for example, partly in the housing central area 14 and partly in the housing end area 18. The edge area 46 of the sensor carrier 60 or of the sensor carrier sheet metal blank 42 is fixed, for example, by fillet welding on the outer surface 44 of the catalytic converter housing 19.

The sensor carrier 60 or the sensor carrier sheet metal blank 42 is provided, for example, entirely on the housing end area 18 in the embodiment variant shown in FIG. 10. The sensor opening 38 is arranged entirely in the conical area of the housing end area 18.

It is advantageous in case of the positioning of a sensor carrier 60 as shown in FIG. 9 to connect the different areas or components of the catalytic converter housing 19, i.e., the housing central area 14 and the housing end areas 16, 18, to one another, for example, by welding and/or press fit before the sensor carrier 60 is placed on the transition area 76. In the case of the positioning shown in FIGS. 8 and 10, the sensor carrier 60 can be fixed on the respective area or the respective component of the catalytic converter housing 19 before or after these areas or components of the catalytic converter hosing 19 are assembled.

It should be noted that a plurality of sensor carriers 60 may be provided on the catalytic converter housing 19. For example, at least one sensor carrier 60 each may thus be provided on each of the two housing end areas 16, 18 in order to be able to detect, for example, the composition of the gas or the gas temperature in the area located upstream of the two catalytic converter units 20, 22 and in the area located downstream of the catalytic converter units 20, 22, or in order to be able to detect respective different measured variables in these areas. As an alternative or in addition, a plurality of sensor carriers 60 may also be provided on the housing central area 14, for example, following one another in the circumferential direction.

Further, a plurality of sensor mounting openings, for example, two sensor mounting openings, may be provided next to one another on at least one of the sensor carriers, so that a plurality of sensors, which are configured, for example, for detecting different measured variables, can be carried on a single sensor carrier. The sensor carrier, on the one hand, and, on the other hand, the sensor opening provided, associated with same, on the catalytic converter housing, can have correspondingly larger dimensions in this case. Further, sensor carriers of different shapes may be provided on one catalytic converter housing in order to guarantee, for example, the suitable installation position for the respective sensors to be arranged there, depending on the installation location.

While specific embodiments of the invention have been shown and described in detail to illustrate the application of the principles of the invention, it will be understood that the invention may be embodied otherwise without departing from such principles.

What is claimed is:

1. A method for manufacturing a catalytic converter housing arrangement with at least one sensor carrier for an exhaust system of a vehicle, the method comprising the steps of:

providing a catalytic converter housing, made of a sheet metal material, with at least one sensor opening;

providing at least one sensor carrier sheet metal blank with an initial sensor carrier sheet metal blank material thickness by punching or cutting the sensor carrier sheet metal blank out of a basic sheet metal material and then transforming the sensor carrier sheet metal blank to a desired shape, such that an edge area of the sensor carrier sheet metal blank is shaped for being in contact with the catalytic converter housing in an entire area surrounding the at least one sensor opening;

forming a sensor mounting opening in the provided sensor carrier sheet metal blank having the desired shape by flow drilling such that a length of the sensor mounting opening is greater than the initial sensor carrier sheet metal blank material thickness;

preparing an internal thread in the sensor mounting opening for providing the at least one sensor carrier;

fixing the sensor carrier sheet metal blank having the desired shape on the catalytic converter housing before or after forming the sensor mounting opening and before preparing the internal thread.

2. A method in accordance with claim 1, wherein the step of fixing the sensor carrier sheet metal blank comprises fixing by welding.

3. A method in accordance with claim 2, wherein the step of fixing the sensor carrier sheet metal blank comprises placing the sensor carrier sheet metal blank on an outer surface of the catalytic converter housing and fixing by fillet welding.

4. A method in accordance with claim 2, wherein the step of fixing the sensor carrier sheet metal blank comprises inserting the sensor carrier sheet metal blank into a sensor carrier depression formed on the catalytic converter housing in an area of a sensor opening and fixing by I-profile seam welding.

5. A method in accordance with claim 1, wherein the catalytic converter housing is provided with an essentially cylindrical housing central area and an essentially conical housing end area at at least one end of the housing central area.

6. A method in accordance with claim 5, wherein the catalytic converter housing is provided with at least one sensor opening in the housing central area.

7. A method in accordance with claim 5, wherein the catalytic converter housing is provided with at least one sensor opening in at least one housing end area.

8. A method in accordance with claim 5, wherein the catalytic converter housing comprises at least one sensor opening in at least one transition area from the housing central area to a housing end area.

9. A catalytic converter arrangement for an exhaust system of a vehicle, the catalytic converter arrangement comprising a catalytic converter housing arrangement manufactured with a method comprising the steps of:

providing a catalytic converter housing, made of a sheet metal material, with at least one sensor opening;

providing at least one sensor carrier sheet metal blank with an initial sensor carrier sheet metal blank material thickness by punching or cutting the sensor carrier sheet metal blank out of a basic sheet metal material and then transforming the sensor carrier sheet metal blank to a desired shape, such that an edge area of the sensor carrier sheet metal blank is shaped for being in contact with the catalytic converter housing in an entire area surrounding the at least one sensor opening;

forming a sensor mounting opening in the provided sensor carrier sheet metal blank having the desired shape by flow drilling such that a length of the sensor mounting opening is greater than the initial sensor carrier sheet metal blank material thickness;

preparing an internal thread in the sensor mounting opening for providing the at least one sensor carrier;

fixing the sensor carrier sheet metal blank having the desired shape on the catalytic converter housing before or after forming the sensor mounting opening and before preparing the internal thread.

10. A catalytic converter arrangement in accordance with claim 9, further comprising at least one catalytic converter unit carried in the catalytic converter housing arrangement.

11. A catalytic converter arrangement in accordance with claim 9, further comprising:

a sensor carried by a thread meshing with the internal thread in the sensor mounting opening.

12. A catalytic converter arrangement in accordance with claim 11, wherein the sensor is a temperature sensor.

13. A catalytic converter arrangement in accordance with claim 11, wherein the sensor is a gas sensor.

14. A catalytic converter arrangement in accordance with claim 13, wherein the sensor is an $O_2$ sensor or $NO_x$ sensor.

15. A method for manufacturing a catalytic converter housing arrangement, the method comprising the steps of:

providing a housing defining a sensor opening;

providing a blank separate from said housing, said blank having a first shape and an initial thickness;

transforming the blank to a second shape separate from said housing, such that an edge area of the blank is shaped for being in contact with the housing in an entire area surrounding the sensor opening;

forming a mounting opening in the blank having the second shape by flow drilling such that an axial length of the sensor mounting opening is greater than the initial thickness of the blank;

fixing the blank having the second shape on the housing before or after forming the mounting opening;

preparing an internal thread in the mounting opening after said forming and said fixing.

16. A method in accordance with claim 15, wherein:

said providing of the blank is performed by punching or cutting the blank out of sheet metal material into the first shape.

* * * * *